(12) United States Patent
Zhang et al.

(10) Patent No.: US 9,598,545 B2
(45) Date of Patent: Mar. 21, 2017

(54) ADVANCED SEPARATORS BASED ON AROMATIC POLYMER FOR HIGH ENERGY DENSITY LITHIUM BATTERIES

(71) Applicant: UChicago Argonne, LLC, Chicago, IL (US)

(72) Inventors: Zhengcheng Zhang, Naperville, IL (US); Jung-Je Woo, Naperville, IL (US); Khalil Amine, Oakbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 304 days.

(21) Appl. No.: 13/755,823

(22) Filed: Jan. 31, 2013

(65) Prior Publication Data
US 2014/0212748 A1    Jul. 31, 2014

(51) Int. Cl.
| C08J 5/18 | (2006.01) |
| H01M 2/14 | (2006.01) |
| H01M 2/16 | (2006.01) |
| C08J 5/22 | (2006.01) |
| H01M 10/0525 | (2010.01) |

(52) U.S. Cl.
CPC ............... *C08J 5/18* (2013.01); *C08J 5/2256* (2013.01); *H01M 2/145* (2013.01); *H01M 2/166* (2013.01); *H01M 2/1686* (2013.01); *C08J 2371/12* (2013.01); *H01M 10/0525* (2013.01)

(58) Field of Classification Search
USPC ............... 429/129–147, 208–246, 247–255; 29/623.1–623.5
See application file for complete search history.

(56) References Cited

U.S. PATENT DOCUMENTS

| 3,256,219 | A | * | 6/1966 | Will ................................. 521/62 |
| 3,647,554 | A | * | 3/1972 | Arrance et al. ................ 429/139 |
| 3,749,604 | A | | 7/1973 | Langer et al. |
| 5,882,721 | A | * | 3/1999 | Delnick ........................... 427/77 |
| 5,952,124 | A | * | 9/1999 | Kainthla et al. ............... 429/224 |
| 2011/0027642 | A1 | * | 2/2011 | Lee .................... B01D 67/0079 429/145 |
| 2014/0370358 | A1 | * | 12/2014 | Hong et al. .................... 429/126 |

FOREIGN PATENT DOCUMENTS

EP    0618629 A1    12/1996

OTHER PUBLICATIONS

Cho, et al., "Battery performances and thermal stability of polyacrylonitrile nano-fiber-based nonwoven separators for Li-ion battery", Journal of Power Sources, 2008. 181(1): p. 155-160.
Cho, et al., "Composite nonwoven separator for lithium-ion battery: Development and characterization", Journal of Power Sources, 2010. 195(13): p. 4272-4277.

(Continued)

*Primary Examiner* — Matthew Merkling
(74) *Attorney, Agent, or Firm* — Foley & Lardner LLP (57) ABSTRACT

A process includes casting a solution including poly(phenylene oxide), inorganic nanoparticles, a solvent, and a non-solvent on a substrate; and removing the solvent to form a porous film; wherein: the porous film is configured for use as a porous separator for a lithium ion battery.

12 Claims, 10 Drawing Sheets

(56) References Cited

OTHER PUBLICATIONS

Choi et al., "Particle size-dependent, tunable porous structure of a SiO(2)/poly(vinylidene fluoride-hexafluoropropylene)-coated poly-(ethylene terephthalate) nonwoven composite separator for a lithium-ion battery". Journal of Materials Chemistry, 2011. 21(38): p. 14747-14754.

Choi, et al., "Enhancement of thermal stability and cycling performance in lithium-ion cells through the use of ceramic-coated separators", Journal of Power Sources, 2010. 195(18): p. 6192-6196.

Jeong, et al., "A novel poly(vinylidene fluoride-hexafluoropropylene)/poly(ethylene terephthalate) composite nonwoven separator with phase inversion-controlled microporous structure for a lithium-ion battery", Journal of Materials Chemistry, 2010, 20, p. 9180-9186.

Kim, et al., "Preparation of a trilayer separator and its application to lithium-ion batteries", Journal of Power Sources, 2010. 195(24): p. 8302-8305.

\* cited by examiner

FIG. 1A (Surface) and 1B (Cross-section)

ADVANCED SEPARATORS BASED ON AROMATIC POLYMER FOR HIGH ENERGY DENSITY LITHIUM BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to lithium ion batteries. More specifically, it is related to separators for use in lithium ion batteries.

BACKGROUND

Demand for high power batteries has been increasing with the commercial success of electric and hybrid vehicles. High power batteries require higher safety standards in order to prevent or at least minimize damage to people and property from catastrophic events in the batteries. To enhance safety of the battery, it is important to employ a separator having high thermally stability to prevent physical contact of the electrodes at elevated temperatures. Presently available separators are primarily based upon polyolefins such as polyethylene (PE) and polypropylene (PP). However, because PE and PP exhibit insufficient thermal stability for high power batteries, several approaches have been developed to improve thermal stability of the separator.

SUMMARY

In one aspect, a process is provided for preparing a separator for a battery, the separator being based upon a poly(phenylene oxide) (PPO)/inorganic nanoparticle composite. The process is referred to as a dry phase inversion process that include casting and drying of a film to facilitate formation of porous film as a layered structure or directly on an electrode. The films prepared by the process are thermally stable. Use of the termally stable films as battery separators can improve the safety of a battery by maintaining electrode separation at elevated temperatures or under abuse conditions. Moreover, dry phase inversion induced separator, layered separator, and separator electrode assembly can reduce manufacturing cost of batteries.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Unless expressly indicated otherwise, alkyl groups may be substituted, or unsubstituted, and if no designation is used, it is assumed that the alkyl group may be either substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein, the term haloalkyl is an alkyl group having one or more halo groups. In some embodiments, haloalkyl refers to a per-haloalkyl group.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In one aspect, a thermally stable separator based on poly(phenylene oxide) (PPO) and an inorganic nanoparticulate material is provided. As used herein poly(phenylene oxide) refers to compounds of general formula:

where each R is an alkyl group. R may be a $C_{1-12}$ alkyl. In some embodiments, R is methyl, ethyl, n-propyl, or iso-propyl. In one particular embodiment, the PPO is poly(2,6-dimethyl-1,4-phenylene oxide). Illustrative inorganic nanoparticulate materials include silica and alumina. Where the nanoparticulate material is a silica, such a separator is referred to as a PPO-silica composite separator, or PSCS. Where the nanoparticlulate material is a alumina, the separator is a PPO-alumin composite separator, or PACS. PSCSs and PACSs are prepared by dispersion of the nanoparticles through a dry phase inversion process.

The dry phase inversion process includes the use of a solvent (a material in which the PPO is freely soluble) in conjunction with a non-solvent (a material in which the PPO is insoluble, or has only a limited solubility). In the process, a solution of the PPO and nanoparticles is cast on a substrate. A porous structure of the separator is induced by phase separation during the drying process of the PPO and nanoparticles in a mixture of solvent and non-solvent. Without the nanoparticles, the PPO membrane that will be formed will have a non-porous skin layer, with spherical pores in the membrane, but with poor connectivity. Due to the skin, Li-ion conduction through the membrane is blocked leading to the poor conductivity and high cell-resistance. The addition of the silica or alumina nanoparticles to the solution with the PPO, leads to the formation of a perforated skin and well-connected pores, leading to remarkably improved Li-ion conductivity compared to a PPO separator.

The PPO nanoparticle composite separators are thermally robust. For example, the PSCS and PACS maintains its shape without significant thermal shrinkage at temperatures over 200° C. Therefore, PSCS and PACS can prevent physical contact between two electrodes under abuse conditions such as internal short circuit or overcharge.

In addition to separately forming a film, the films may be cast directly on an electrode. Such coated electrodes can significantly reduce cost of production by excluding conventional separators, and producing battery cells with continuous casting and drying process. Where the separator is cast directly on the surface of the electrode, the separators may thinner, allowing for fabrication of cells that have a greater amount of electrode materials in the same volume as compared to convention cells with conventional separators.

Films of the porous PPO-nanoparticulate composites may also be formed into a three layer separator structure as a coating layer on a polyolefin-based separator. A typical 3-layer separator has a porous polyethylene (PE) middle layer coated on both of its faces with porous polypropylene (PP). At the elevated temperature, the PE layer melts, thereby closing the pores and effectively shutting down conduction through the separator, while PP layers continue to separate the electrodes. It is clear that the higher difference in thermal stability between the middle layer and the coating layer improves safety during shutdown process. The melting point difference between the PE and the PP is approximately 30° C. In the present application, use of a PSCS or PACS on the PE or the PP in a 3-layer separator increases the thermal integrity difference between the layers to more than 100° C.

In one embodiment, a process is provided for the production of a porous separator using the dry phase inversion. The process includes casting a solution of the poly(phenylene oxide), inorganic nanoparticles, a solvent, and a non-solvent on a substrate; and removing the solvent to form a porous film. Such porous films are configured for use as a porous separator for a lithium ion battery. The process may also include drying of the film.

Where the process includes the formation of a 3-layer separator, the central layer may be the substrate of the process, where the PPO-nanoparticle solution is cast on the central layer (e.g. polypropylene). Layers of PE may then be layered on each side of the coated PP layer to form a porous 3-layer separator. Alternatively, the PSCS or PACS may be the central layer of the 3-layer separator, with PE being attached to, or grafted to, the surfaces of the PSCS or PACS separator. Accordingly, in another aspect, a 3-layer separator formed by the process is provided.

Formation of the porous layer using the above process may include forming multiple layers of the PPO-nanoparticle composite. Accordingly, after formation of a first PPO-nanoparticle, porous film, a second porous film of PPO-nanoparticles may be formed on the surface of the first. This may include casting a second solution of poly(phenylene oxide), inorganic nanoparticles, a solvent, and a non-solvent on the first porous film; and removing the solvent to form the second porous film. Other layers may be added as desired. Accordingly, in another aspect, a layered separator formed by the process is provided.

The substrate of the process may be an electrode, with the formation of the porous separator on the electrode. Accordingly, in another aspect, an electrode formed by the process is provided.

In the process, a volume ratio of the non-solvent to the solvent may be from about 0.001 to about 0.30. This includes where the volume ratio of the non-solvent to the solvent may be from about 0.1 to about 0.2.

The solvents include those solvents for the PPO. For example, illustrative solvents include, but are not limited to, halogenated solvents, benzene, xylene, and toluene. For example, halogenated solvent may include solvents such as, but not limited to, chloroform, methylene chloride, carbon tetrachloride, chlorobenzene, and dichlorobenzene. The non-solvents are those solvents in which the PPO is insoluble, or in which the PPO is minimally soluble (e.g. less than 0.1 g per ml of solvent). Illustrative non-solvents include, but are not limited to alcohols, water, acetone, N,N-Dimethylformamide, N-Methyl-2-pyrrolidone, and N,N-Dimethylacetamide. For examples, non-solvent alcohols may include, but are not limited to, n-propanol, n-butanol, n-pentanol, n-hexanol, n-heptanol, n-octanol, isomers thereof, or a mixture of any two or more alcohols or isomers thereof.

As noted above, the nanoparticles may include nanoparticles of silica or alumina. In one embodiment, the nanoparticles are silica. In another embodiment, the nanoparticles are alumina. The inorganic particles may have an average particle size of from about 1 nm to about 100 nm. This includes where the inorganic particles have an average particle size of from about 10 nm to about 15 nm. This also includes where the the inorganic nanoparticles have an average particle size of from about 20 nm to about 30 nm.

In the PPO-nanoparticle composite, the nanoparticles may be present at amounts up to approximately 50 wt %, based upon the weight of the PPO. This includes where the inorganic nanoparticles are present from about 1 wt % to about 50 wt % with regard to the poly(phenylene oxide). This also includes where the inorganic nanoparticles are present from about 5 wt % to about 20 wt % with regard to the poly(phenylene oxide). This also includes where the inorganic nanoparticles are present from about 10 wt % to about 20 wt % with regard to the poly(phenylene oxide).

In another aspect, an electrode is provided, the electrode including a porous separator prepared by casting a solution comprising poly(phenylene oxide), inorganic nanoparticles, a solvent, and a non-solvent on the electrode; and removing the solvent to form a film of the porous separator. The film may be trimmed or fitted to size it for use as a porous separator. Such electrodes may include a positive active material or a negative active material. The electrodes may also include a current collector, a binder, or both a current collector and a binder, as are known in the art.

In another aspect, a battery is provided, the battery including an electrolyte, an anode, a cathode, and a porous separator between the anode and the cathode, wherein the porous separator is prepared by casting a solution that includes poly(phenylene oxide), inorganic nanoparticles, a solvent, and a non-solvent on a substrate; and removing the solvent to form a porous film.

The present invention, thus generally described, will be understood more readily by reference to the following examples, which are provided by way of illustration and are not intended to be limiting of the present invention.

EXAMPLES

Example 1

Figure 1A:
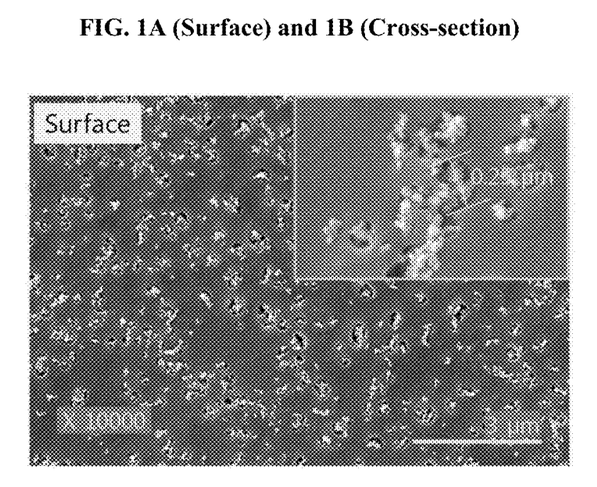
FIGS. 1A and 1B are SEM images of a PPO/SiNP composite separator (PSCS) on the surface (1A) and as a cross-section (1B).
Figure 1B:
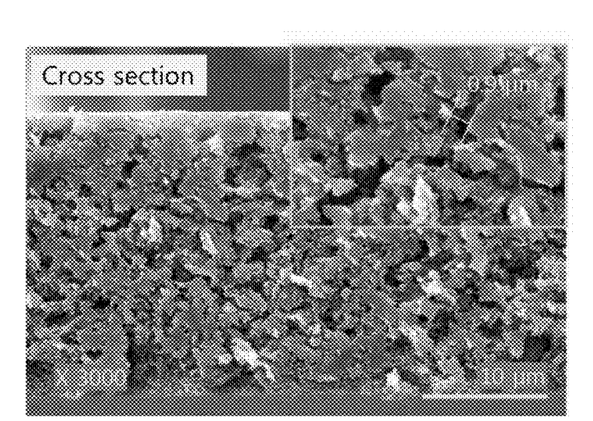

Preparation of PPO/Silica nanoparticle Composite Separator (PSCS). To prepare a casting solution, 0.6 g of poly(phenylene oxide) (PPO) and 0.1 g of silica nanoparticles (SiNP, 15-20 nm) were dissolved in a mixture of 4.25 ml of chloroform (solvent) and 0.75 ml of butyl alcohol (non-solvent) under vigorous stirring. The solution was then cast onto a glass plate and dried at room temperature for 1 hour. The PPO/SiNP composite was detached from the glass slide by brief soaking in deionized water. The composite is the PSCS. After removal from the glass, the PSCS was further dried at 60° C. under vacuum, overnight. FIGS. 1A and 1B are scanning electron microscope (SEM) images of the PSCS. The PSCS had a perforated surface with submicron-sized pores filled with SiNP. The cross-sectional image shows well-connected porous structure, leading to facial ion transfer through liquid electrolyte within pores.

Example 2

Figure 2:
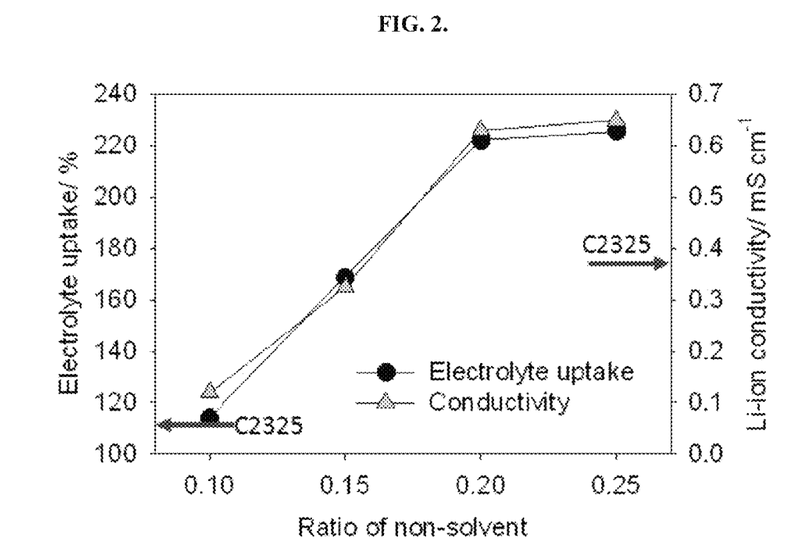
FIG. 2 is a dual axis graph illustrating the effect of non-solvent to solvent ratio on lithium ion conductivity.

Effect of the non-solvent amount on separator formation. To investigate the effect of non-solvent on the film formation, PSCSs were prepared as above with 15 wt % silica nanoparticle (SiNP) based upon the amount of PPO and with varying volume ratios of butyl alcohol to chloroform. As illustrated in FIG. 2, higher concentrations of butyl alcohol increased ionic conductivity of separators, however, the increment was not significant at non-solvent:solvent ratios greater than 0.20.

Example 3

Figure 3:
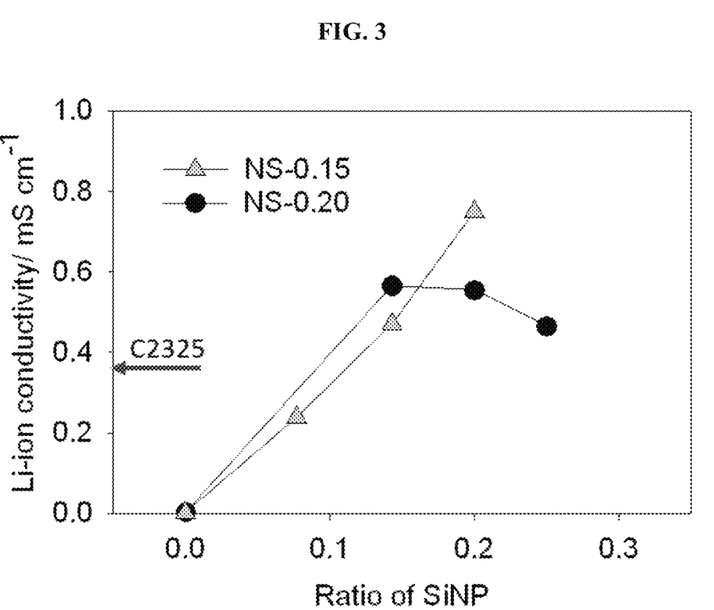
FIG. 3 is a graph illustrating the effect of the wt % of SiNP in PPO in a separator film with respect to conductivity.

Effect of silica nanoparticle (SiNP). To investigate the effect of SiNP, separators were prepared with a non-solvent:solvent ratio of 0.15, with various weight ratios of SiNP to PPO. As shown in FIG. 3, higher ratios of SiNP to PPO showed remarkably improved ionic conductivity. Without SiNP, conductivity was extremely low. By adding SiNP, the conductivity rapidly increased and reached almost twice that of Celgard2325 (C2325), a separator for lithium batteries that is commercially available.

Example 4

Comparative example of the thermal stability of Celgard2325 (C2325), a PPO separator (PPOS), and a PSCS. The PSCS was prepared as in Example 1 with PPO, 15 wt. % SiNP, and a ratio of butyl alcohol:chloroform of 0.15. The PPOS was prepared by the same procedure, excluding SiNP from the polymer solution. The C2325 was obtained from commercial vendors.

Figure 4A:
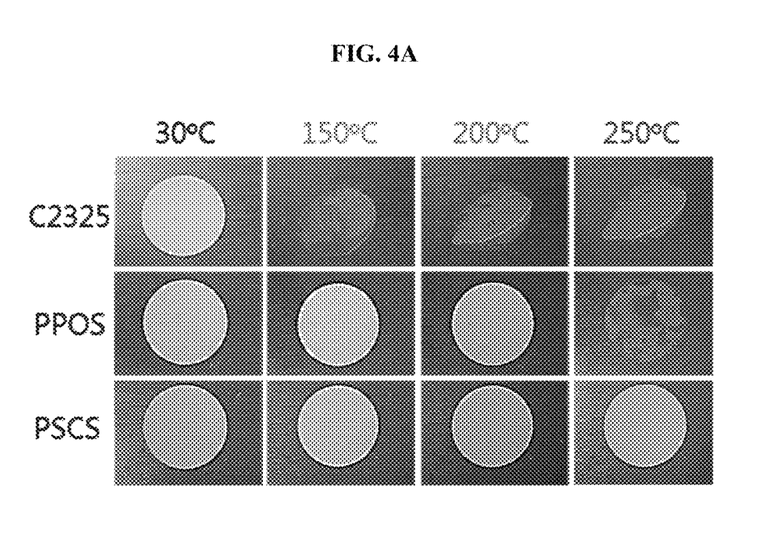
FIG. 4A is a photograph of separators after heating at various temperatures.
Figure 4B:
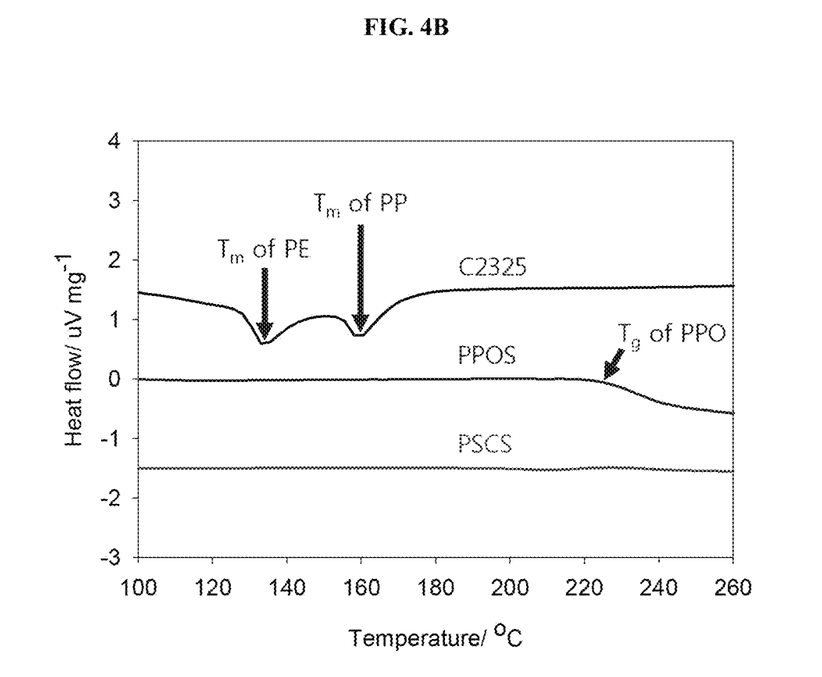
FIG. 4B is a composite DSC trace for commercial separators in comparison to separators of the examples below.

The separators were heated at various temperatures and thermal deformation was investigated. As shown in FIG. 4A, the C2325 significantly shrank at 150° C., and fully melted at 200° C. The shape of PPO separator was mostly maintained up to 200° C., however, the collapse of pores translated PPOS to a transparent film at 250° C. FIG. 4B is a DSC composite graph illustrating the thermal stability of the separators. As shown, the PSCS is superior either the C2325 or the PPOS. The PSCS maintained its shape up to 250° C., and the PSCS is termally stable to a temperature that is greater than 250° C.

Example 5

Figure 5A:
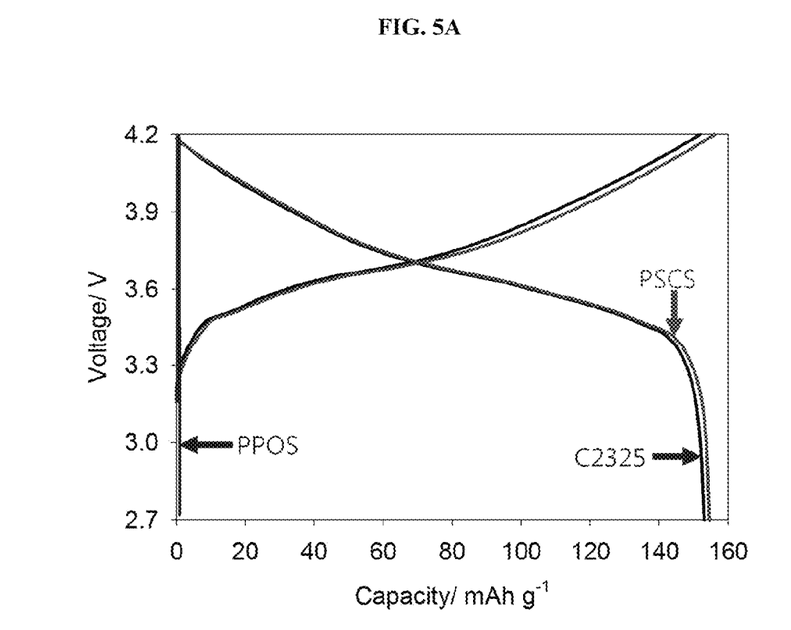
FIG. 5A is a voltage profile graph for cells assembled with C2325, PPOS, and PSCS at a 0.1 C charge-discharge rate, according to the examples.
Figure 5B:
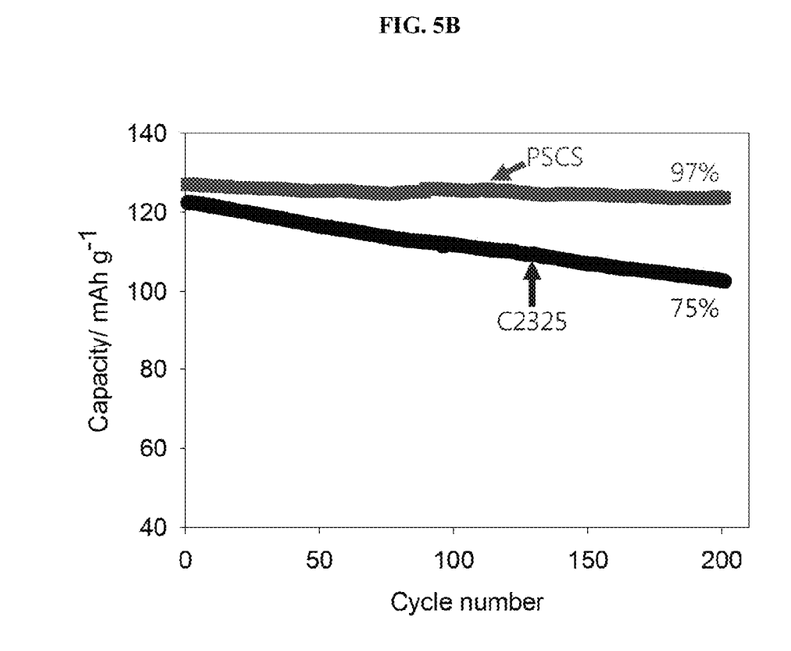
FIG. 5B is a capacity v. cycle number for a C2325-cell and a PSCS-cell at a 2 C charge-discharge rate, according to the examples.

Comparative example, of the cycling performance of cells assembled with C2325, a PPOS, and a PSCS. The voltage profile of the PSCS at a 0.1 C charge-discharge rate was almost the same as that of C2325. However, the cell assembled with the PPOS could not be cycled mainly due to high internal resistance. At a 2 C charge-discharge rate (3.2 mA/cm$^2$), the PSCS-cell exhibited noticeable improvement of cycle life compared to C2325-cell. After 200 cycles, the PSCS-cell maintained 97% of its initial discharge capacity, whereas the C2325-cell maintained only 75%. This is illustrated by the graphs in FIGS. 5A and 5B.

Example 6

Preparation of a PPO/Al$_2$O$_3$ nanoparticle Composite Separator (PACS). Analogous to Example 1, but instead of SiNP, Al$_2$O$_3$ nanoparticle (AlNP) was added into polymer solution to produce PPO/AlNP composite separator (PACS). The conductivity of PACS (0.5 mS cm$^{-1}$) was higher than that of C2325 (0.36 mS/cm).

Example 7

Figure 6A:
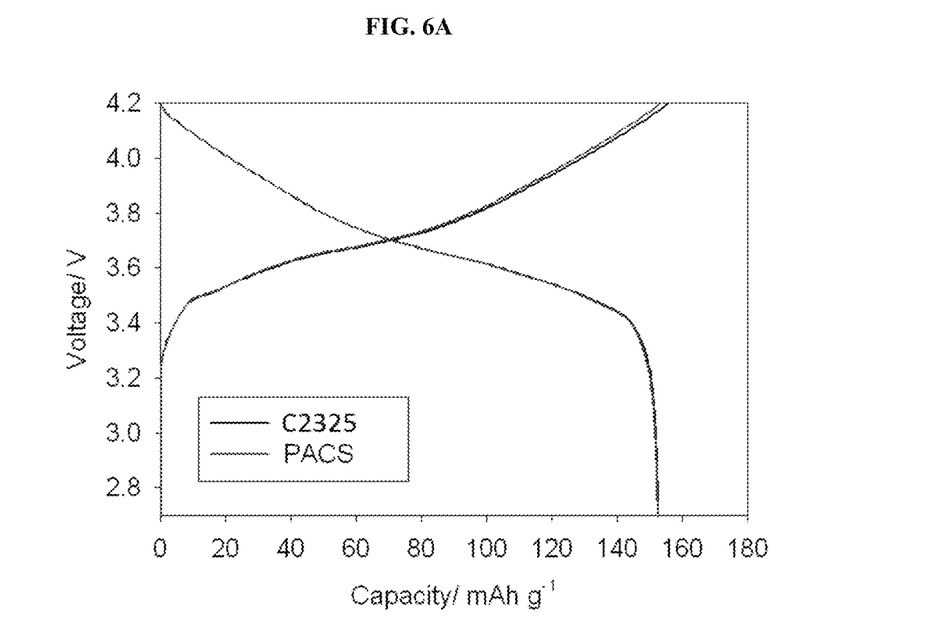
FIG. 6A is a voltage profile graph the cells assembled with C2325 and PACS at a 0.1 C charge-discharge rate, according to the examples.
Figure 6B:
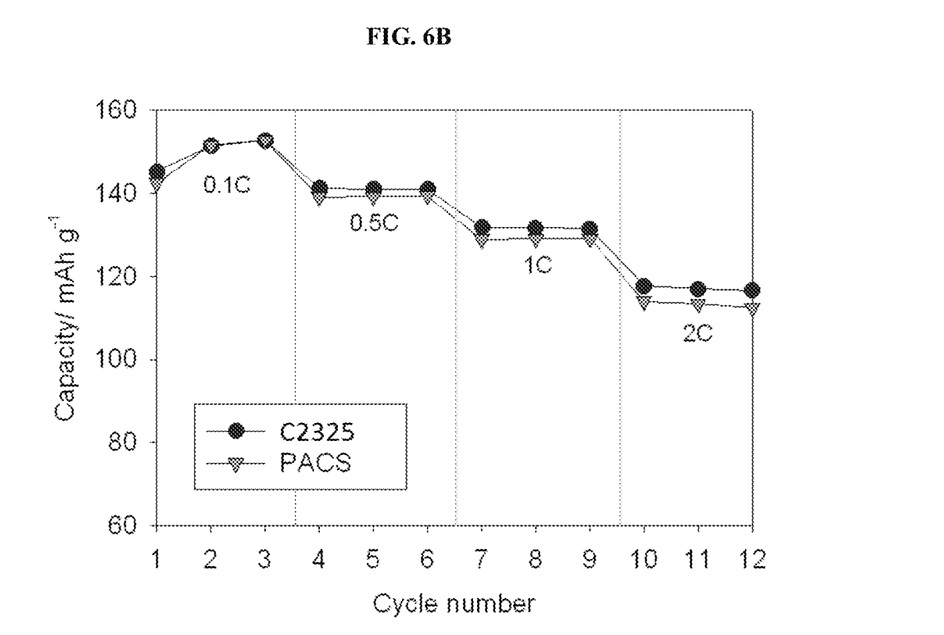
FIG. 6B is a cycling performance graph of a C2325-cell and a PACS-cell at various C-rates, according to the examples.

Comparative example illustrating the cycling performance of cells assembled with C2325 and PACS. As illustrated in FIGS. 6A and 6B, a PACS-cell showed comparable voltage profile and rate performance to a C2325-cell. The result implies that various types of inorganic particles can be used to prepare composite separators.

Example 8

Figure 7:
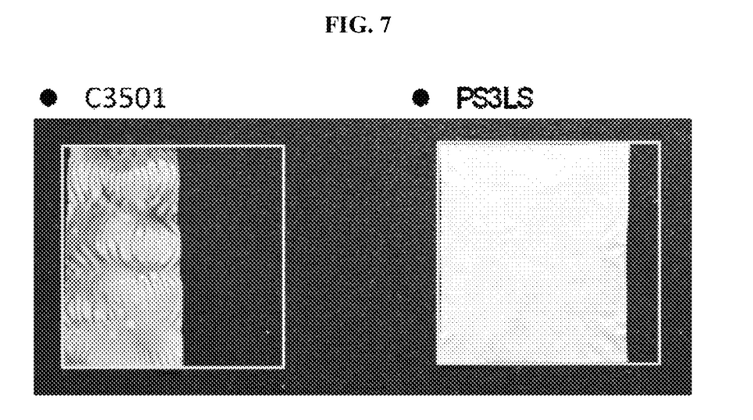
FIG. 7 is a photograph of Celgard3501 and PS3LS after heating at 150° C. for 30 min.

Preparation of a PPO/SiNP coated 3-layer separator (PS3LS). In order to prepare a three layer separator, both sides of a commercial Celgard3501 (C3501) separator was coated with a polymer solution composed of PPO/SiNP (6:1, wt./wt.) in a mixture of chloroform and butyl alcohol (9:1, vol./vol.). The thickness of coating layer was approximately 2.5 μm. To investigate the thermal stability of PS3LS, separators were heated at 150° C. for 30 min. Although the coating layer was much thinner than that of a typical 3 layer separator (Celgard2325, about 7 μm), the PPO/SiNP layer effectively suppressed thermal shrinkage of PS3LS. After heating, thermal shrinkage of C3501 was 49.0% whereas that of PS3LS was only 14.7% (FIG. 7).

Example 9

Figure 8A:
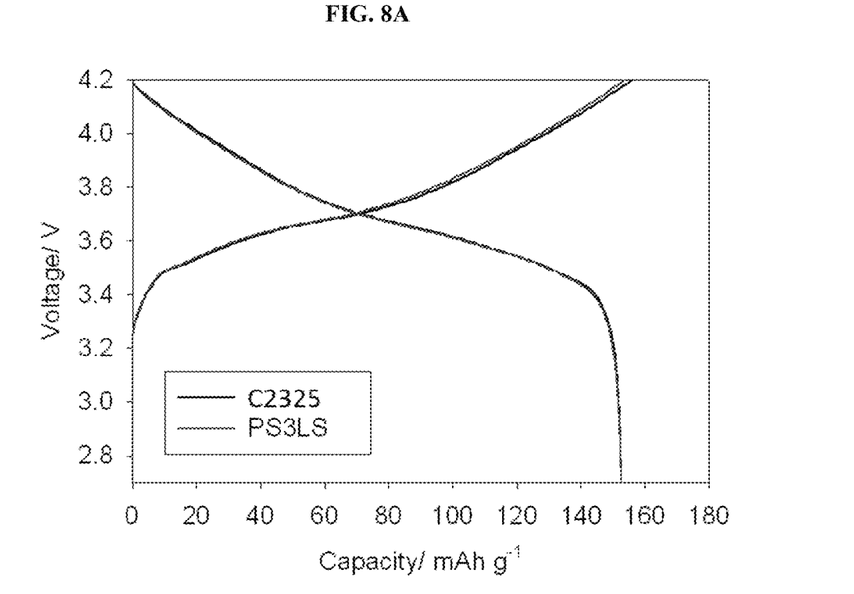
FIG. 8A is a voltage profile graph of cells assembled with C2325 and with PS3LS at a 0.1 C charge-discharge rate, according to the examples.
Figure 8B:
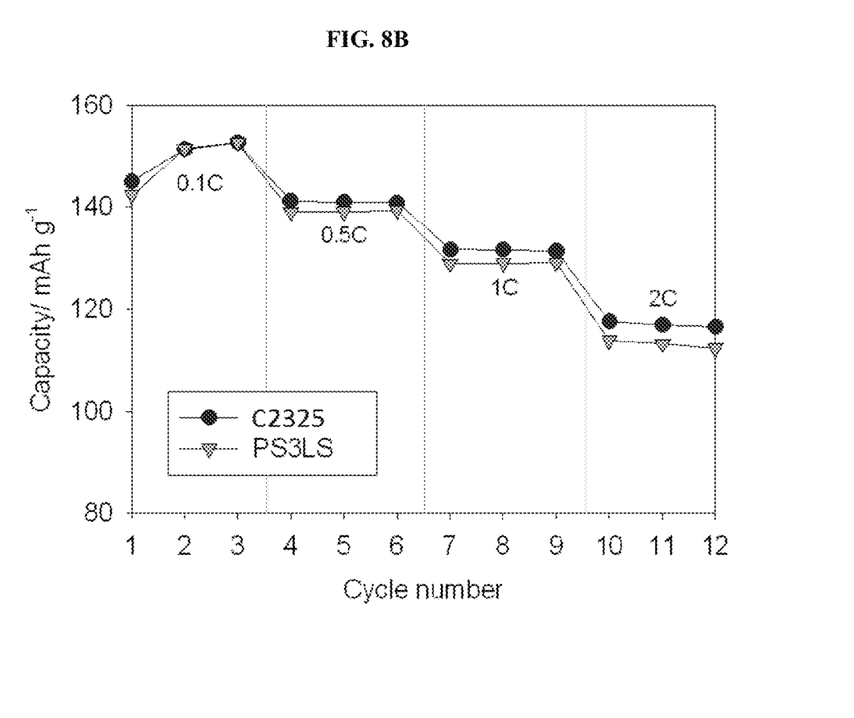
FIG. 8B is a cycling performance graph of a C2325-cell and a PS3LS-cell at various C-rates, according to the examples.

Comparative example of the cycling performance of cells assembled with C2325 and PS3LS. As illustrated in FIGS. 8A and 8B, the conductivity of PS3LS was 0.64 mS/cm. At a 0.1 C-rate, the voltage profile of PS3LS-cell was almost equal to that of C2325. The C-rate performance over the range of 0.1-2 C was investigated. At high C-rate, the PS3LS-cell showed slightly lower performance compared to C2325-cell.

Example 10

Figure 9A:
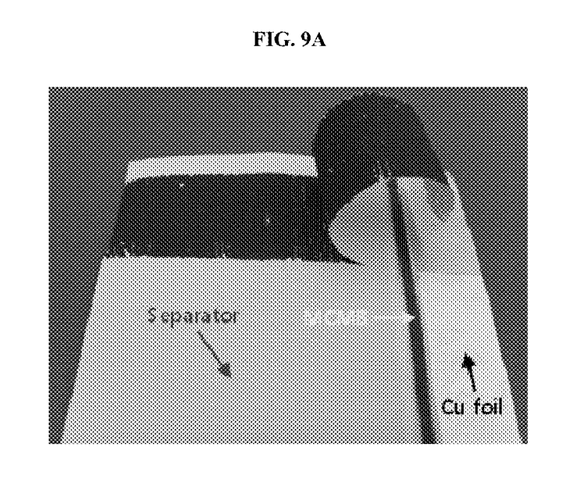
FIG. 9A is a photograph of an SEA, according to the examples.
Figure 9B:
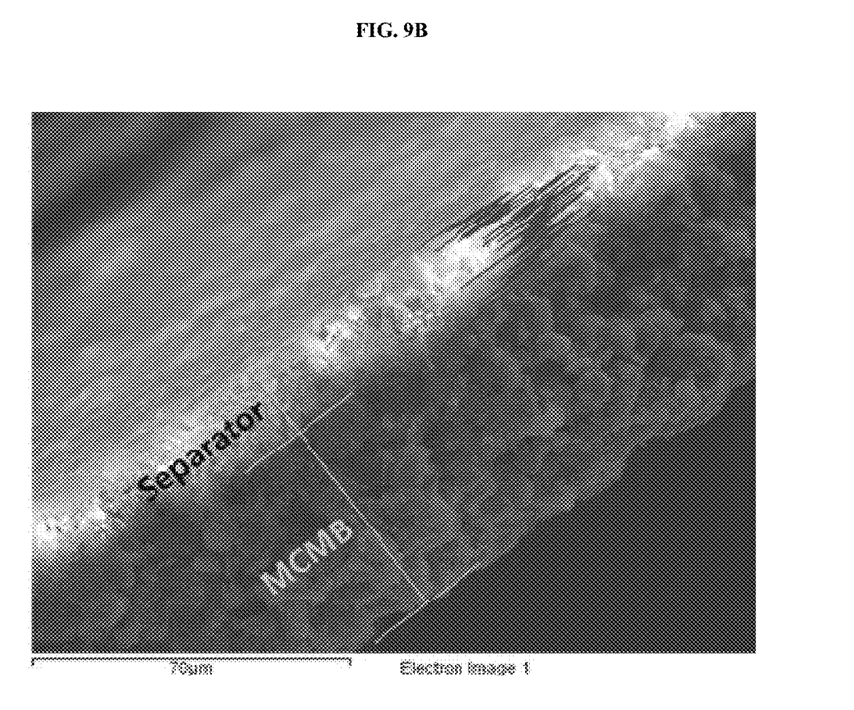
FIG. 9B is an SEM image of a SEA, according to the examples.

The preparation of a separator electrode assembly (SEA). A SEA was prepared by casting PPO/SiNP solution on a mesocarbon microbead (MCMB) anode. The casting was then dried at room temperature for 2 hours, followed by further drying at 60° C. under vacuum, overnight. The coating layer was tightly attached on the surface of the MCMB. The distribution of silica indicates that the polymer solution did not penetrate into the pores of the MCMB-anode during the coating process. FIG. 9A is a photograph of the film peeling from the MCMB using a scotch tape. The coating layer was not separated from MCMB particles even after peeling off. FIG. 9B is an SEM image of the side of the film on the MCMB.

Example 11

Figure 10A:
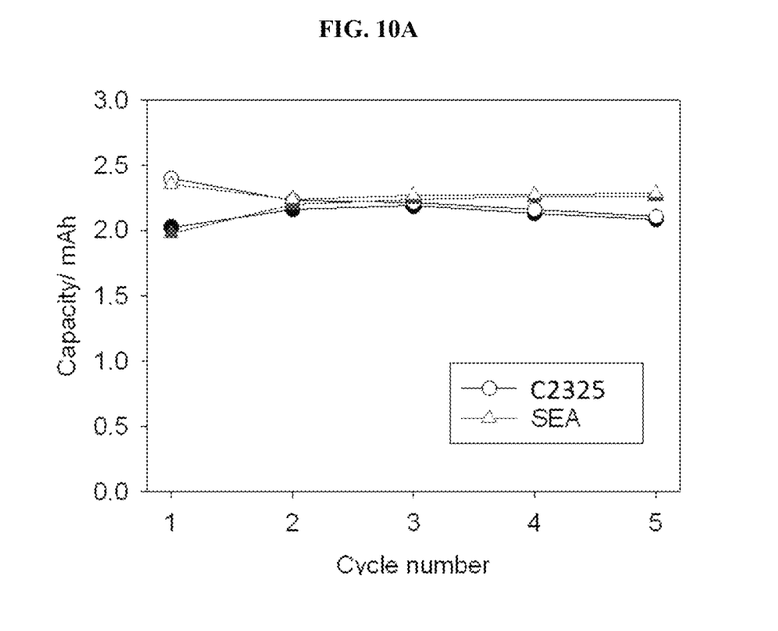
FIG. 10A is a capacity graph for a half-cell assembled with MCMB/C2325/Li-metal and a half cell assembled with SEA/Li-metal, according to the examples.
Figure 10B:
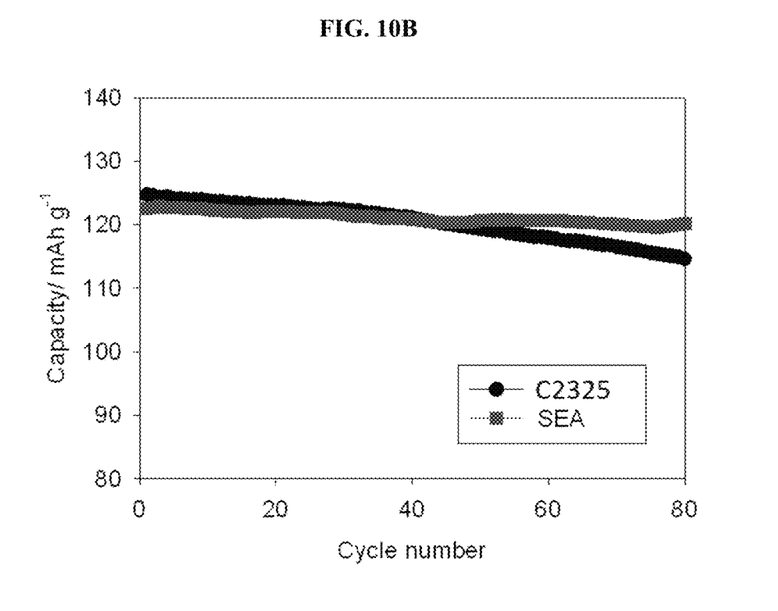
FIG. 10B is a capacity v. cycle number for the C2325-cell of FIG. 10A and the SEA-cell of FIG. 10A, at 2 C charge-discharge rate.

Comparative Example, Cycling performance of cells assembled with Celgard2325 and SEA. FIG. 10A illustrates the capacity of an SEA half-cell compared to that of a C2325 half-cell. As shown, the coating layer of the SEA did not cause loss of the capacity of the MCMB-anode. Moreover, at high C-rate charge/discharge (2 C/2 C), the SEA full-cell showed more stable cycling performance than the C2325 full-cell (FIG. 10B).

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process for forming a porous film separator on the surface of an electrode, the process comprising:
    casting a solution comprising poly(phenylene oxide), inorganic nanoparticles, a solvent, and a non-solvent on the electrode, wherein the electrode comprises an electroactive material and a current collector; and
    removing the solvent to form the porous film separator on the surface of the electrode;
    wherein:
        the inorganic nanoparticles have an average particle size of from about 1 nm to about 100 nm;
        the solvent is selected from the group consisting of a halogenated solvent, benzene, xylene, toluene, and a mixture of any two or more thereof; and
        the non-solvent is selected from the group consisting of an alcohol, acetone, N,N-dimethylformamide, N-Methyl-2-pyrrolidone, N,N-dimethylacetamide, and a mixture of any two or more thereof.

2. The process of claim 1, wherein a volume ratio of non-solvent to solvent is from about 0.001 to about 0.30.

3. The process of claim 1, wherein a volume ratio of non-solvent to solvent is from about 0.1 to about 0.2.

4. The process of claim 1, wherein the solvent comprises a halogenated solvent selected from the group consisting of chloroform, methylene chloride, carbon tetrachloride, chlorobenzene, dichlorobenzene, or a mixture of any two or more thereof.

5. The process of claim 1, wherein the non-solvent comprises an alcohol and the alcohol is selected from the group consisting of n-propanol, n-butanol, n-pentanol, n-hexanol, n-heptanol, n-octanol, isomers thereof, or a mixture of any two or more alcohols or isomers thereof.

6. The process of claim 1, wherein the inorganic nanoparticles are silica nanoparticles, alumina nanoparticles, or a combination thereof.

7. The process of claim 1 further comprising drying the porous film separator.

8. The process of claim 1, wherein the inorganic nanoparticles are present from about 1 wt % to about 50 wt % with regard to the poly(phenylene oxide).

9. The process of claim 1, wherein the inorganic nanoparticles are present from about 5 wt % to about 20 wt % with regard to the poly(phenylene oxide).

10. The process of claim 1, wherein the inorganic nanoparticles are present from about 10 wt % to about 20 wt % with regard to the poly(phenylene oxide).

11. The process of claim 1 further comprising forming a second porous film on the porous film, the forming comprising casting a second solution comprising poly(phenylene oxide), inorganic nanoparticles, a solvent, and a non-solvent on the porous film separator; and removing the solvent to form a two-layer porous film.

12. The process of claim 1, wherein the poly(phenylene oxide) is poly(2,6-dimethyl-1,4-phenylene oxide).

* * * * *

UNITED STATES PATENT AND TRADEMARK OFFICE
CERTIFICATE OF CORRECTION

PATENT NO. : 9,598,545 B2
APPLICATION NO. : 13/755823
DATED : March 21, 2017
INVENTOR(S) : Zhengcheng Zhang, Jung-Je Woo and Khalil Amine Page 1 of 1

It is certified that error appears in the above-identified patent and that said Letters Patent is hereby corrected as shown below:

In the Claims

In Claim 11, Column 10, Lines 22-27:

Delete the misprinted claim and replace it with the originally-submitted claim as shown:

11. The process of Claim 1 further comprising forming a porous film on the porous film separator, the forming comprising casting a second solution comprising poly(phenylene oxide), inorganic nanoparticles, a solvent, and a non-solvent on the porous film separator; and removing the solvent to form a two-layer porous film separator.

Signed and Sealed this
Twentieth Day of June, 2017

Joseph Matal
*Performing the Functions and Duties of the
Under Secretary of Commerce for Intellectual Property and
Director of the United States Patent and Trademark Office*